Feb. 15, 1966     E. R. CUNNINGHAM     3,235,317
THRUST BEARING ARRANGEMENTS FOR ROTATING MACHINES
Filed Jan. 2, 1964     2 Sheets-Sheet 1
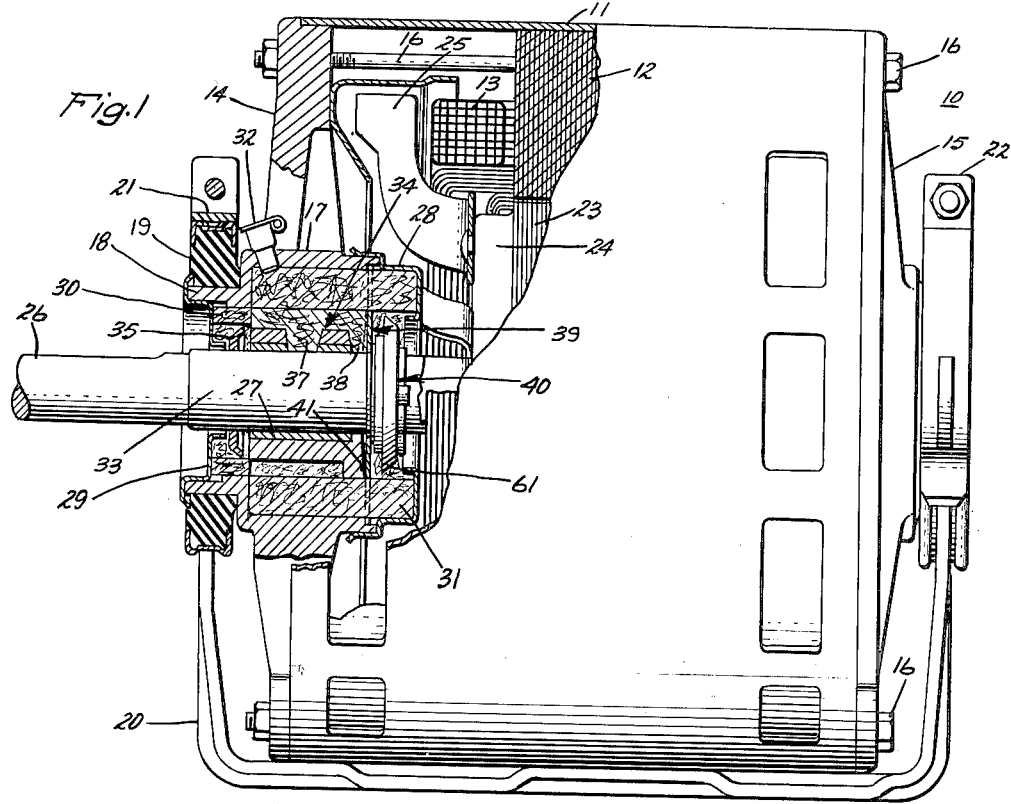
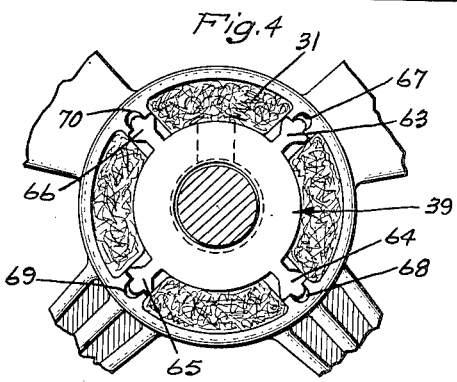
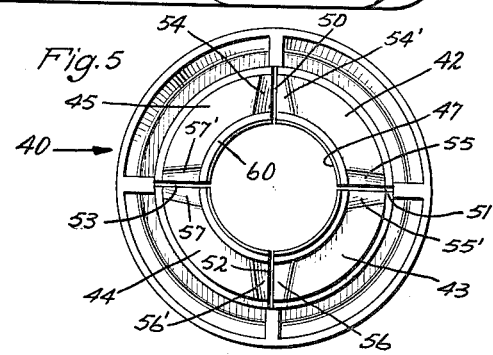
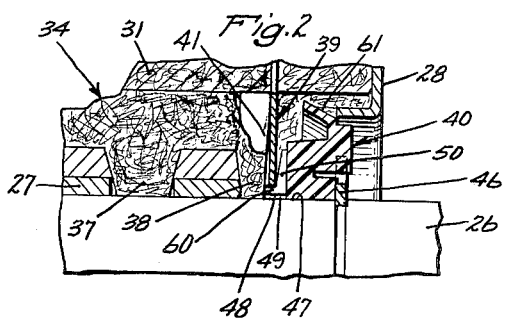
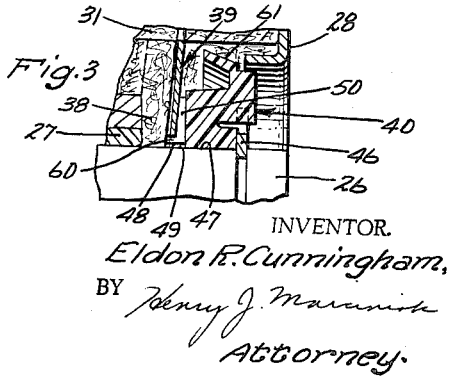
INVENTOR.
Eldon R. Cunningham,
BY Henry J. Maraninik
Attorney.

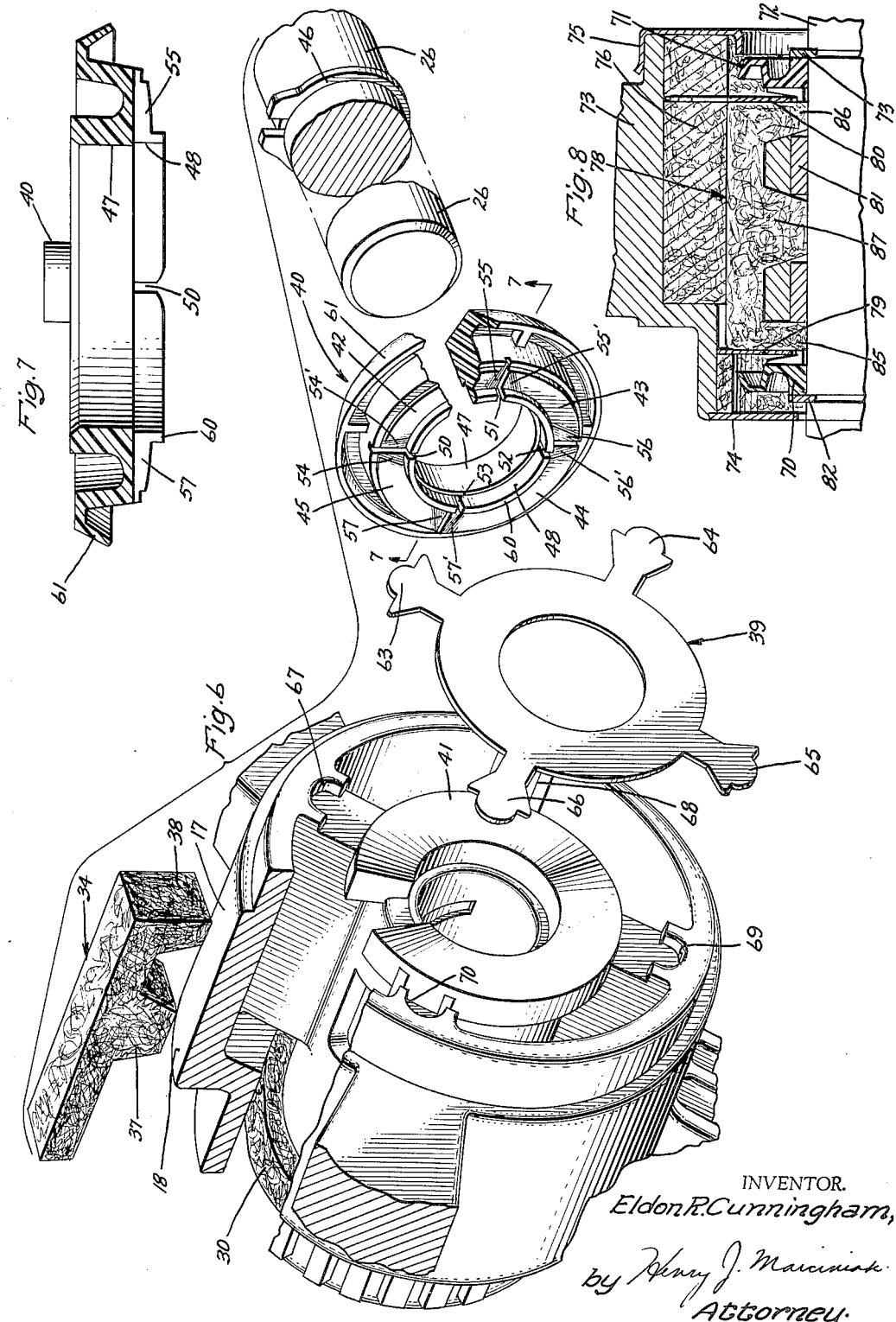

United States Patent Office 3,235,317
Patented Feb. 15, 1966

3,235,317
THRUST BEARING ARRANGEMENTS FOR ROTATING MACHINES
Eldon R. Cunningham, Fort Wayne, Ind., assignor to General Electric Company, a corporation of New York
Filed Jan. 2, 1964, Ser. No. 335,253
9 Claims. (Cl. 308—132)

This invention relates to rotating machines and other apparatus having rotatable parts. More particularly the invention relates to an improved axial thrust bearing arrangement for dynamoelectric machines.

In the operation of a dynamoelectric machine, such as a fractional horsepower motor, a stationary thrust receiving member and rotating thrust bearing member carried on the shaft are normally provided to take up the axial thrust of the shaft and maintain the rotor in proper axial position. In a commonly used arrangement a sleeve type of bearing has an aperture communicating with a lubricant reservoir by means of a feed wick to supply lubricant from the reservoir to the shaft journal. The thrust surface of the thrust bearing member is usually lubricated by the end leakage from the sleeve bearing.

A disadvantage of such a conventional arrangement for lubricating the thrust bearing member is that the flow of lubricant is dependent upon the speed of rotation and also upon the direction of the shaft rotation. Thus, the thrust bearing surfaces may not be adequately lubricated at low speeds. Also, when the direction of shaft rotation changes, the direction of end leakage changes to the other end of the sleeve bearing, and consequently, the thrust surfaces may not receive an adequate supply of oil.

It is particularly desirable in some applications that "end bump" noise set up by the varying axial thrust of a motor be minimized without impairing the heat transfer between the thrust surfaces of the bearing thrust member and the stationary thrust receiving means which is supported by the motor end shield. In a commonly used arrangement a spring is utilized to isolate the axial forces from the end shield. Although conventional spring arrangements prevent the transmission of the "end bump" forces to the motor end shield, such arrangements have not been particularly effective in dissipating the heat generated by the thrust bearing surfaces.

Accordingly, it is an object of my invention to provide an improved thrust bearing arrangement for use in rotating machines such as electric motors having improved thermal characteristics.

It is another object of my invention to provide an improved thrust bearing arrangement for use in rotating machines having a rotating shaft in which the flow of lubricant to the thrust bearing surfaces is essentially independent of the speed of rotation of the shaft.

A further object of my invention is to provide an improved thrust bearing arrangement wherein the flow of lubricant as to the thrust bearing surfaces is essentially independent of the direction of rotation of the shaft.

It is still a further object of my invention to provide an improved thrust bearing arrangement wherein the "end bump" noise is essentially minimized without impairing the heat transfer from the thrust bearing surfaces to the stationary members of the machine which serve as a heat sink.

In accordance with one form of my invention, I have provided an improved axial thrust bearing arrangement for a rotating machine such as an electric motor. The improved axial thrust bearing arrangement includes a thrust bearing member having a plurality of thrust bearing surfaces and a plurality of radially extending capillary passages or grooves communicating with the thrust bearing surfaces. To take up the thrust of the rotor, a thrust receiving means is provided for engagement with the rotating thrust bearing member carried on the shaft. Preferably, in applications where it is desirable to minimize "end bump" noise, the thrust receiving means includes a thrust spring interposed between the thrust bearing member and a conical bearing post. Under load the thrust spring is deflectable to provide a capillary spacing between the thrust spring and the conical bearing post. Thus, lubricant is drawn between the thrust spring and bearing post in order to promote the dissipation of heat generated on thrust bearing surfaces during operation to the end shield of which the bearing post is an integral part.

The thrust bearing member, preferably, includes an inner bore section comprised of a first axially extending bore for mounting the thrust bearing member on the shaft with a pressed fit and a second axially extending bore spaced from the shaft to provide an annular capillary passage along the shaft. To provide for the flow of lubricant to the thrust bearing surfaces, the annular capillary passage communicates with radially extending passages or grooves which cut through the thrust bearing surfaces. At one end of the annular capillary passage I include an oil supply means, which preferably consists of a radial projection from the feed wick which supplies oil to the shaft journal bearing. The radial projection of the feed wick wipes a band of oil at the inlet of the annular capillary passage which is drawn by surface tension into the annular capillary passage. An important advantage of the improved capillary arrangement for feeding lubricant to the thrust bearing surfaces is that the supply of lubricant is essentially independent of the speed of rotation of the shaft and also is independent of the direction of the shaft rotation.

According to a more specific aspect of the invention the capillary grooves which feed lubricant to the thrust surfaces are formed with chamfers at the edges along which the radial capillary grooves intersect the thrust surfaces. With this arrangement the flow of oil between the thrust surfaces and the thrust spring is initiated by capillary action. Further, according to another specific aspect of the invention the thrust spring may be formed with a plurality of radially extending projections which are engaged in the bearing housing to fixedly support the thrust spring in a position adjacent to the bearing post. Preferably, the projections of the thrust spring may be cruciform in shape and engage a complementary portion formed in the bearing housing to hold the thrust spring in radial alignment and prevent rotational movement of the thrust spring. With such a support arrangement for the thrust spring it was possible to isolate the axial vibrations of the rotor from the stationary thrust receiving means without appreciably affecting the heat transfer between the thrust receiving means and the thrust bearing member.

The subject matter which I regard as my invention is particularly pointed out and distinctly claimed in the concluding portion of this specification. My invention, however, both as to organization and method of operation, together with further objects and advantages therein, may be best understood by reference to the following description taken in conjunction with the accompanying drawings in which:

FIGURE 1 is a side elevational view of an electric motor assembly embodying one form of the improved thrust bearing arrangement of the invention, the view being partially broken away and partially in section in order to generally illustrate the thrust bearing arrangement;

FIGURE 2 is an enlarged fragmentary view, the thrust bearing arrangement, illustrated in FIGURE 1 with the thrust bearing member shown in section and the thrust spring shown in the "no-load" condition;

FIGURE 3 is a fragmentary view corresponding to the view shown in FIGURE 2 with the thrust spring in the loaded condition;

FIGURE 4 is a fragmentary end view of the end shield showing the manner in which the thrust spring is engaged and supported by the end shield;

FIGURE 5 is an enlarged end view of the thrust bearing member as seen from the left side of the thrust bearing member shown in FIGURE 1, the view illustrating the thrust bearing surfaces;

FIGURE 6 is an exploded view of the thrust bearing assembly;

FIGURE 7 is a sectional view taken essentially along the section line 7—7 of the thrust bearing member illustrated in FIGURE 6; and FIGURE 8 is a fragmentary view showing an improved thrust bearing arrangement embodying another form of the invention.

Referring now more particularly to FIGURE 1 of the drawings, I have shown therein an electric motor of the squirrel cage type generally identified by the reference numeral 10. The motor 10 includes an outer cylindrical shell member 11 within which is mounted a stator 12 formed of a plurality of laminations of magnetic material. The stator 12 is formed in the standard manner and comprises a plurality of stacked thin laminations of magnetic material. Suitable energizing coils 13 mounted in slots (not shown) are provided in the stator 12. A pair of end shields 14 and 15 are secured to the cylindrical shell member 11 by a plurality of through-bolts 16. It will be seen that end shield 14 has a bearing housing 17 with a hub 18 on which a resilient mounting 19 is arranged. The resilient mounting 19 is secured to a U-shaped support base 20 by a clamp 21. Similarly, at the right side of the motor 10 a resilient mount (not shown) is held against the support base 20 by a clamp 22.

Mounted within the stator 12 and excited magnetically therefrom is a rotor member 23. The rotor member 12 is formed of a stack of magnetic laminations and includes slots adjacent to its outer periphery in which are formed the conductors of a squirrel cage winding. At the left side of the rotor member 23 the conductors are joined by an end ring 24 on which fan blades 25 are mounted as shown in FIGURE 1. A similar arrangement is provided at the right side of the rotor member 23 except that the fan blades do not exceed the diameter of the rotor member 23.

The rotor member 23 is fixedly secured to a shaft 26 rotatably carried on opposite sides of the rotor by a stationary sleeve type of bearing only the sleeve bearing 27 at the left side as viewed in FIGURE 1 being shown. For simplicity of illustration, only one end of the motor 10 has been cutaway and partially sectionalized to show in detail the improved thrust bearing arrangement.

An enclosure for the oil return wicking 30 and the storage wicking 31 is formed within the cylindrical bearing housing 17 by covering one end with an oil well cover 28 and the other end with an end cap 29. The oil well cover 28 is adapted to fit over and engage the outer periphery of the bearing housing 17. The end cap 29 is pressed into the inner periphery of the outer portion or hub 18 of the bearing housing 17. The bearing housing 17 is provided with an opening through which a lubricant such as a standard lubricating oil may be introduced from time to time into lubricant storage wicking reservoir as needed and which is closed by a standard pressed-in oil cup 32.

In order to provide suitable lubrication to the journal surface 33 of the shaft 26, a feed wick 34 adjoins the storage wicking 31, which functions as a lubricant reservoir, and feeds lubricant to the journal surface 33. To insure against leakage of lubricant externally of the motor 10, an oil deflector 35 is attached to the shaft 26 to deflect the lubricant leaking from the sleeve bearing 27 into the return wicking 30. It will be seen that the feed wick 31 is provided with inwardly directed radial projections 37 and 38, one of which contacts the shaft 26 through an opening in the sleeve bearing 27 for supplying oil to the journal surface 31. The other projection 38 wipes the shaft 26 at the inboard end of the sleeve bearing 27 and touches one side of a thrust spring 39 to provide a heat transfer oil film as will hereinafter be described. Also, the wick projection 38 touches the annular projection 60 of the thrust bearing member 40 to assure oil feed to the capillary 49.

Having more specific reference now to FIGURES 2–7 of the drawings, I will now more fully describe the improved thrust bearing arrangement. The improved thrust bearing arrangement includes the thrust spring 39, a thrust bearing member 40, and a bearing post or support member 41. The thrust bearing member 40 is preferably formed of a tough, wear-resistant material. As is best seen in FIGURES 5 and 6, the thrust bearing member 40 has a plurality of thrust surfaces 42, 43, 44 and 45 which engage the inboard face of the thrust spring 39. The thrust bearing member is restrained from moving axially inward along the shaft 26 by a retaining split ring 46. To hold the thrust bearing member 40 in non-rotational engagement on the shaft 26 and prevent oil leakage inwardly along the shaft 26, the inner bore section of the thrust bearing member 40 is provided with a first bore 47 dimensioned so that the member 40 is mounted on the shaft 26 with a pressed fit. The inner bore section of the thrust bearing member 40 includes a second bore 48 spaced from the shaft to provide an annular capillary passage 49.

Positive feeding of the lubricant to the thrust surfaces 42, 43, 44 and 45 of the thrust member 40 is obtained from the band of lubricant laid on the shaft 26 by the end of the radial projection 38 of the feed wick 43 and drawn through the annular capillary passage 49 and the radially extending capillary passage or grooves 50, 51, 52 and 53. The annular capillary passage 49 extends through the opening in the thrust spring 39 so that the inlet of the capillary passage 49 is in intimate contact with the band of lubricant wiped on the shaft 26 and projection 60 by the radial wick projection 38. It will be seen in FIGURES 5 and 6 that the chamfers 54, 54', 55, 55', 56, 56' and 57, 57' are formed at the edges of the radial capillary grooves 50, 51, 52 and 53. These chamfers also provide a capillary dimension when the thrust surfaces 42, 43, 44 and 45 abut the thrust spring 39 so that lubricant is conducted to the thrust surfaces by capillary type of action. Also, the chamfers prevent the radial capillary passages 50, 51, 52 and 53 from being clogged during operation. Foreign matter in the system accumulates in the space or pocket provided by the chamfers without closing or plugging the capillary passages. As this foreign matter accumulates in the space provided by the chamfers, they are flushed out from between the thrust bearing member 40 and thrust spring 39 by centrifugal action and returned to the storage wicking 31 where the foreign matter is filtered out of the oil.

It was found that in the illustrated embodiment of the invention for a lubricating oil having a viscosity of 150 seconds Saybolt Universal at 100 degrees Farenheit, a capillary spacing of .010 of an inch or less was sufficient to draw oil into the annular capillary passage 49. In the illustrated exemplification of the invention, a capillary dimension ranging from .004 to .006 of an inch was used for the annular capillary passage 49 and a dimension ranging from .013 to .017 of an inch was used for the radial capillary passages 50, 51, 52 and 53. It was experimentally determined that within this range of dimensions an adequate supply of oil was supplied to the bearing surfaces 42, 43, 44 and 45 at the operating temperature of the bearing.

Preferably, the axial depth of the radial capillary passages 50, 51, 52 and 53 was selected so that a sufficient quantity of oil was supplied to the thrust bearing surfaces 42, 43, 44 and 45 and also so that some allowance was made for wear on the thrust bearing surfaces. Further, it will be appreciated that the axial depth of the radial capillary passages 50, 51, 52 and 53 must be sufficient so that the oil at the bottom of the passages will stay at a relatively lower temperature than the oil near the bearing surfaces so that the capillary action will not be effected by the higher temperature near the thrust bearing surfaces. Since the thrust bearing member 40 is made of a plastic material, the axial thermal gradient will cause the bottom of the passages 50, 51, 52 and 53 to be at a relatively lower temperature due to the relatively lower thermal conductivity of the plastic material.

As is best seen in FIGURES 2 and 3, the thrust bearing member 40 is formed with an annular extension 60 which extends axially through the shaft opening of the thrust spring 39 and engages the radial projection 38 of the feed wick 34 so that an intimate contact is maintained between the feed wick 34 and the annular capillary passage 49. This arrangement insures that the annular capillary passage 49 is in continuous contact with the supply of lubricant. Further, it will be seen that the thrust bearing member 40 is formed with an oil flinger portion 61 which causes lubricant thrown from the shaft 26 to be deflected against the storage wicking 31 and also prevents lubricant from being thrown out into the interior of the motor 10 through the opening in the oil well cover 28.

In the illustrated embodiment of the invention the thrust spring 39 and stationary bearing post 41 served as a thrust receiving means. During operation the thrust bearing surfaces 42, 43, 44 and 45 normally engage the thrust spring 39. As is best seen in FIGURES 4 and 6, the thrust spring 39 is formed with four cruciform projections 63, 64, 65 and 66 which are engaged in complementary arcuate portions 67, 68, 69 and 70 formed in the bearing housing 17 to prevent rotational movement of the thrust spring 39. When the thrust spring 39 has no axial thrust applied to it as shown in FIGURE 2, the thrust spring 39 is free to deflect as a Bellville type of spring.

The bearing post 41 is formed with a conical surface having an angle slightly larger than that of the angle of the thrust spring 39 at its maximum deflection as shown in FIGURE 3 so that a small axial clearance of capillary dimensions is provided between the bearing post 41 and the thrust spring 39. This clearance promotes the flow of lubricant to the contact area between the bearing post 41 and the thrust spring 39. It was found that the heat transfer from the thrust spring 39 can be appreciably increased by providing a film of lubricant between the bearing post 41 and the thrust spring 39. If "end bump" noise is to be effectively minimized, it will be appreciated that the entire thrust spring 39 must not touch the bearing post 41 except at the outer diameter of the spring 39. In the thrust spring used in the exemplification of the invention it was found that the thickness of the thrust spring 39 could be reduced to provide an axial spring constant that isolated 120 cycle axial forces without causing an increase in operating temperature of the thrust bearing 40 as compared with an identical thrust spring that did not have an oil film between it and the bearing post.

It will be understood, of course, in applications where axial vibration isolation is not required a stationary thrust surface may be employed that contacts the bearing post over its entire radial width. With the improved thrust bearing arrangement utilizing an oil film between the thrust spring 39 and bearing post 41, it was possible to provide axial vibration isolation without seriously impairing the heat transfer between the thrust bearing member 40 and the bearing post of the bearing housing 17 which serves as the heat sink.

The manner in which the illustrated embodiment of my invention operates will now be more fully described by referring to FIGURES 1, 2 and 3. Let us assume that as the shaft rotates, thrust is transmitted from the shaft 26 and forces the thrust bearing member 40 against the thrust spring 39 as shown in FIGURE 3. As the shaft 26 rotates, the radial projection 38 of the feed wick 34 wipes a band of oil on the shaft 26 at the inlet of the annular capillary passage 49 between the thrust bearing member 40 and the shaft 26. Lubricating oil flows by the action of surface tension to the four radial capillary passages 50, 51, 52 and 53 to the chamfers where the oil is fed into the thrust bearing surfaces 42, 43, 44 and 45. An important advantage of the improved thrust bearing arrangement is that the flow of oil to the thrust bearing member 40 is independent of the direction of rotation and the speed of rotation of the shaft 17 since it is dependent essentially on capillary action.

The lubricating oil which flows radially outward from between the thrust surfaces is thrown by the oil deflector portion 61 into the storage wicking 31. The oil stored in the storage wicking 31 is drawn by the feed wick 34 and fed to the shaft journal 33 and the inlet to the annular capillary passage 49 by means of the radial projections 37, 38. Thus, in this manner, the lubricating oil is recirculated and a continuous supply of oil is maintained to the sleeve bearing 27 and the thrust bearing member 40.

Having more specific reference now to FIGURE 8, I have illustrated therein another form of the invention in which a pair of the thrust bearing members 70 and 71 are adapted to allow the shaft 72 to accept thrust loads in two directions. The thrust bearing arrangement is essentially contained within a bearing housing 73 closed at the ends by an end cap 74 and an oil well cover 75. The bearing assembly includes storage wicking 76, return wicking 77, a feed wick 78, an outboard thrust spring 79, an inboard thrust spring 80, a sleeve bearing 81, the thrust bearing members 70, 71 and a pair of retaining rings 82, 83. The thrust bearing members 70, 71 are identical in configuration to the thrust bearing members 40 used in the previously described embodiment of the invention and provide an annular capillary passage between the members 70, 71 and the shaft 72. Also, the thrust bearing members 70, 71 includes a plurality of radial capillary passages to feed oil to the thrust bearing surfaces.

It will be noted that the feed wick 78 is formed with an inboard and an outboard radial projection 85 and 86 for feeding lubricating oil to the adjacent thrust bearing members 70 and 71 and is also formed with a central projection 87 for supplying oil to the shaft journal. When the thrust on the shaft 72 forces the shaft to the left as seen in FIGURE 8, the thrust bearing member 71 at the right side comes into play. Similarly, when the thrust exerted by the shaft 72 forces the shaft to the right, the left thrust bearing member 70 comes into play to transmit the thrust to the thrust spring 79.

From the foregoing description of the exemplification of my invention, it will be apparent that an improved thrust bearing arrangement has been provided wherein a positive feed of lubricating oil to the thrust surfaces of a thrust bearing member is insured by capillary passages communicating with a feed wick to draw the oil by capillary action to the thrust bearing surfaces. The flow rate of the oil supplied to the thrust surfaces is independent of the speed of rotation and the direction of rotation of the motor shaft. The feeding action provided by the improved capillary arrangement is almost instantaneous, and overheating that might impair the flow of lubricating oil is prevented. The improved thrust bearing arrangement is readily adaptable to applications in which it is necessary to isolate the vibrations originating in the rotor from the end shield member.

While the invention has been explained by describing particular embodiments thereof, it will be apparent that changes may be made in the structure disclosed without departing from the scope of the invention. It is, therefore, intended in the following claims to cover all such equivalent variations that fall within the true scope of my invention.

What I claim as new and desire to secure by Letters Patent of the United States is:

1. In an electric motor including a shaft, a rotor mounted on said shaft for rotation with said shaft, and bearing means rotatably supporting said shaft, the improvement comprising a thrust receiving means, a thrust bearing member mounted on said shaft between said rotor and said thrust receiving means, said thrust bearing member having at least one thrust surface disposed towards said thrust receiving means, said thrust bearing member also having a plurality of radially extending capillary passages communicating with said thrust surface of said thrust bearing member, and means for supplying lubricant to said capillary passages, said capillary passages drawing lubricant by action of the surface tension of said lubricant to said thrust surface for feeding oil thereto.

2. In an electric motor including a shaft, a rotor mounted on said shaft for rotation with the shaft, at least one bearing rotatably supporting said shaft, and a housing for said bearing, the improvement comprising: a thrust receiving means, said thrust receiving means including an annular thrust spring and a conical bearing post, said thrust spring having a plurality of cruciform projections extending radially therefrom and engaged with the bearing housing for positioning said thrust spring against said conical bearing post and also for restraining rotational movement of said thrust spring, a thrust bearing member mounted on said shaft between said rotor and said thrust receiving means, said thrust bearing member having thrust surfaces disposed towards said thrust receiving means and said thrust bearing member also having a plurality of radial grooves communicating with said thrust surfaces, and lubricant supply means for providing lubricant to said grooves.

3. In an electric motor including a shaft, a rotor mounted on said shaft, and bearing means rotatably supporting said shaft, the improvement comprising: a thrust receiving means, a thrust bearing member mounted on said shaft between the rotor and said thrust receiving means, said thrust bearing member having at least one thrust surface disposed toward said thrust receiving means, said thrust bearing member also having a plurality of radially extending passages and an axially extending annular capillary passage formed between the thrust bearing member and the shaft, said radially extending passages communicating with said thrust surface and with said annular capillary passage, and supply means for supplying lubricant to said annular capillary passage, said annular capillary passage drawing lubricant from said supply means to feed lubricant to said radially extending passages.

4. In an electric motor including a shaft, a rotor mounted on said shaft for rotation with the shaft, at least one sleeve bearing for rotatably supporting the shaft, a bearing housing, the improvement comprising: a thrust receiving means including an annular thrust spring and a conical bearing post, said thrust spring fixedly supported adjacent to the said conical bearing post and deflectable under load to provide a capillary passage between said conical bearing post and thrust spring to draw lubricant therebetween, said bearing post having a radially extending groove, a thrust bearing member mounted on said shaft between said rotor and said thrust spring, said thrust bearing member having a plurality of thrust surfaces disposed towards said thrust spring for engagement therewith, said thrust bearing member having a plurality of radial capillary grooves communicating with said thrust surfaces and said thrust bearing member and also having an annular capillary passage between said thrust bearing member and the shaft, at least one feed wick for supplying lubricant to the sleeve bearing and the thrust bearing member, said feed wick having a radial projection disposed adjacent to said thrust spring in said radially extending groove of said bearing post, said radial projection contacting the shaft to wipe lubricant thereon at the inlet of said annular capillary passage, and said annular capillary passage drawing lubricant wiped on said shaft to feed said lubricant to said radial capillary grooves for lubricating said thrust surfaces.

5. A thrust bearing member for use in an electric motor including a rotatable shaft, said thrust bearing member comprising an inner bore section having a first axially extending bore for mounting said thrust bearing member in fixed relation with respect to said shaft and a second axially extending bore of such size to form an annular capillary passage between the shaft and the second axially extending bore when the shaft is mounted in the second axially extending bore, a plurality of thrust surfaces formed on said thrust bearing member, and a plurality of radially extending capillary passages communicating with said second bore and said thrust surfaces.

6. In a rotating machine including a shaft, a rotor fixedly secured on said shaft, and bearing means rotatably supporting said shaft, the improvement comprising: a thrust receiving means including a stationary support member and a thrust spring supported adjacent to said stationary support member and deflectable under load to provide a capillary passage between said stationary support member and said thrust spring to draw lubricant therebetween, a thrust bearing member mounted on said shaft between said rotor and said thrust receiving means, said thrust bearing member having at least one thrust surface disposed toward said thrust receiving means and a plurality of radially extending capillary passages communicating with said thrust surface, and lubricant feed means for supplying lubricant to said capillary passages, said capillary passages drawing lubricant by the action of surface tension to feed lubricant to said thrust surface.

7. A thrust bearing member for use on a rotatable shaft, said thrust bearing member comprising an inner bore section formed with a first axially extending bore for mounting said thrust bearing member on said shaft for rotation therewith and a second axially extending bore of such size to provide an annular capillary passage between the shaft and said second bore when the shaft is mounted in the second axially extending bore, said thrust bearing member including a plurality of thrust surfaces and a plurality of radial capillary grooves communicating with said second bore of said inner section and extending between said thrust surfaces to feed lubricant thereto.

8. In an electric motor including a shaft, a rotor mounted on said shaft for rotation with said shaft, and bearing means rotatably supporting said shaft, the improvement comprising: a thrust receiving means, a thrust bearing member mounted on said shaft between said rotor and said thrust receiving means, said thrust bearing member having a plurality of thrust surfaces, said thrust bearing member also having a plurality of capillary grooves extending radially between said thrust surfaces and having chamfers formed along the edges of said capillary grooves joining said thrust surfaces thereby to cause lubricant to be drawn by capillary action between said thrust surfaces and thrust receiving means.

9. In an electric motor including a shaft, a rotor mounted on said shaft for rotation therewith, and bearing means for rotatably supporting said shaft, the improvement comprising: a thrust receiving means including a stationary support member, a thrust spring fixedly supported adjacent to said stationary support member and deflectable under load to provide a capillary passage between said bearing support member and thrust spring to draw lubricant therebetween a thrust bearing member mounted on said shaft between said rotor and said thrust spring, said thrust bearing member having at least one thrust surface disposed toward said thrust spring for engagement therewith, and lubricant feed means for supplying lubricant to said thrust bearing member and to said capillary passage between said thrust spring and said stationary support member, said lubricant supplied to said capillary passage during operation promoting the transfer of heat from said thrust surface to said stationary support member.

References Cited by the Examiner

UNITED STATES PATENTS

| | | | |
|---|---|---|---|
| 2,688,521 | 9/1954 | Annen | 308—187.2 |
| 2,800,373 | 7/1957 | Kablick et al. | 308—121 |

DON A. WAITE, *Primary Examiner.*

F. SUSKO, *Assistant Examiner.*